US008574515B2

(12) United States Patent
Ellis et al.

(10) Patent No.: US 8,574,515 B2
(45) **Date of Patent: *Nov. 5, 2013**

(54) MAGNETIC SEPARATING DEVICE

(75) Inventors: Darren Ellis, Lommedalen (NO); Tine Borgen Hildisch, Oslo (NO); Jeremy Mundy, Highworth (GB); Erlend Ragnhildstveit, Oslo (NO); Richard Johan Toften, Paradis (NO); Kornelija Zgonc, Carlsbad, CA (US); Gaute Brede, Oslo (NO); Lars Noekleby, Oslo (NO)

(73) Assignee: Life Technologies AS, Carlsbad, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/601,783

(22) PCT Filed: May 29, 2008

(86) PCT No.: PCT/EP2008/056649

§ 371 (c)(1), (2), (4) Date: Nov. 11, 2010

(87) PCT Pub. No.: WO2008/145711

PCT Pub. Date: Dec. 4, 2008

(65) Prior Publication Data

US 2011/0198293 A1 Aug. 18, 2011

Related U.S. Application Data

(60) Provisional application No. 61/014,627, filed on Dec. 18, 2007, provisional application No. 61/014,624, filed on Dec. 18, 2007, provisional application No. 60/940,614, filed on May 29, 2007, provisional application No. 60/940,629, filed on May 29, 2007.

(30) Foreign Application Priority Data

| | | |
|---|---|---|
| May 29, 2007 | (GB) | 0710188.4 |
| May 29, 2007 | (GB) | 0710189.2 |
| Dec. 14, 2007 | (GB) | 0724404.9 |
| Dec. 14, 2007 | (GB) | 0724426.2 |

(51) Int. Cl.
*B01D 33/06* (2006.01)

(52) U.S. Cl.
USPC .............................. 422/527; 422/500; 422/50

(58) Field of Classification Search
USPC .............................. 422/527
See application file for complete search history.

(56) References Cited

U.S. PATENT DOCUMENTS

| | | | | |
|---|---|---|---|---|
| 2,358,612 | A * | 9/1944 | Acker | 210/222 |
| 3,674,198 | A | 7/1972 | Eberle | |
| 4,118,801 | A | 10/1978 | Kraft et al. | |
| 4,133,466 | A | 1/1979 | Rosen et al. | |
| 4,883,644 | A | 11/1989 | Perlman | |
| 4,895,650 | A | 1/1990 | Wang | |
| 4,896,560 | A | 1/1990 | Kato | |
| 5,036,989 | A | 8/1991 | Carilli | |
| 5,186,827 | A | 2/1993 | Liberti et al. | |
| 5,458,785 | A * | 10/1995 | Howe et al. | 210/695 |
| 5,465,078 | A * | 11/1995 | Jones, Jr. | 335/305 |
| 5,632,388 | A | 5/1997 | Morrison et al. | |
| 5,705,062 | A * | 1/1998 | Knobel | 210/205 |
| 5,714,063 | A | 2/1998 | Brunsting | |
| 5,827,478 | A | 10/1998 | Carey et al. | |
| 5,993,665 | A | 11/1999 | Terstappen et al. | |
| 6,133,037 | A * | 10/2000 | Tajima | 436/49 |
| 6,187,270 | B1 * | 2/2001 | Schmitt et al. | 422/527 |
| 6,193,892 | B1 | 2/2001 | Krueger et al. | |
| 6,231,814 | B1 * | 5/2001 | Tajima | 422/527 |
| 6,368,561 | B1 * | 4/2002 | Rutishauser et al. | 422/527 |
| 6,514,416 | B1 | 2/2003 | Harradine et al. | |
| 6,558,541 | B1 | 5/2003 | Morrison | |
| 6,586,193 | B2 | 7/2003 | Yguerabide et al. | |
| 6,743,365 | B1 | 6/2004 | Marlowe | |
| 6,752,967 | B2 | 6/2004 | Farina et al. | |
| 7,326,350 | B2 | 2/2008 | Mueller et al. | |
| 2001/0007312 | A1 | 7/2001 | Siddiqi | |
| 2002/0182751 | A1 | 12/2002 | Herr et al. | |
| 2003/0049841 | A1 | 3/2003 | Short et al. | |
| 2003/0134416 | A1 | 7/2003 | Yamanishi et al. | |

| | | | | |
|---|---|---|---|---|
| 2004/0142384 | A1 * | 7/2004 | Cohen et al. | 435/7.2 |
| 2004/0142463 | A1 | 7/2004 | Walker et al. | |
| 2004/0265903 | A1 | 12/2004 | Mueller et al. | |
| 2005/0123445 | A1 | 6/2005 | Blecka et al. | |
| 2010/0264090 | A1 | 10/2010 | Ellis et al. | |
| 2011/0031168 | A1 | 2/2011 | Ellis et al. | |

FOREIGN PATENT DOCUMENTS

| | | |
|---|---|---|
| DE | 10063984 | 6/2002 |
| EP | 0136126 | 4/1985 |
| EP | 0381964 | 8/1990 |
| EP | 0704244 | 5/1996 |
| EP | 1580555 | 9/2005 |
| EP | 1655071 | 5/2006 |
| GB | 2129551 A * | 5/1984 |
| JP | 8304399 | 11/1996 |
| WO | WO90/14891 | 12/1990 |
| WO | WO92/16844 | 10/1992 |
| WO | WO93/22686 | 11/1993 |
| WO | WO99/20397 | 4/1999 |
| WO | WO99/59708 | 11/1999 |
| WO | WO2008/145709 | 12/2008 |
| WO | WO2008/145711 | 12/2008 |
| WO | WO2008/145712 | 12/2008 |

OTHER PUBLICATIONS

CN Application No. 200880017804.5, Office Action mailed Apr. 29, 2011.
GB Application No. 0710189.2, Search Report mailed Aug. 31, 2007.
GB Application No. 0724404.9, Search Report mailed Apr. 9, 2008.
GB Application No. 0710188.4, Search Report mailed Sep. 11, 2007.
GB Application No. 0724426.2, Search Report mailed Apr. 14, 2008.
International Application No. PCT/EP2008/56645, Invitation to Pay Additional Fees and Partial Search Rpt Mailed on Nov. 5, 2008.
International Application No. PCT/EP2008/56650, Office Action mailed on Nov. 3, 2009.
International Application No. PCT/EP2008/056649, International Preliminary Examiner Report mailed Dec. 29, 2008.
International Application No. PCT/EP2008/056649, International Search Report mailed Dec. 29, 2008.
International Application No. PCT/EP2008/056649, Written Opinion mailed Dec. 29, 2008.

* cited by examiner

*Primary Examiner* — Christine T Mui

(57) ABSTRACT

The disclosure relates to a magnetic separating device for isolating magnetically labelled particles from a non-magnetic medium comprising a body portion (1) having a magnetising portion (3) for providing a magnetic field and a surface by means of which the body portion may stand on a supporting surface; and a sample vessel retaining portion (4) for retaining at least one sample vessel (5), wherein, the magnetising portion (3) is configured to conform at least approximately to at least a substantial portion of the longitudinal profile of at least one sample vessel (5); the sample vessel retaining portion (4) is configured to retain at least one sample vessel (5) such that at least a portion of the contents of the sample vessel (5) is visible to a user; and the sample vessel retaining portion (4) is configured to be mountable on the magnetising portion so that in use, the at least one sample vessel is subject to the magnetic field of the magnetising portion (3). The disclosure further relates to a kit of parts and a method for isolating magnetically labelled particles from a non-magnetic medium using the magnetic separation device.

28 Claims, 14 Drawing Sheets

MAGNETIC SEPARATING DEVICE

The present application is the national stage filing of International Application No. PCT/EP2008/056649, filed May 29, 2008, which claims priority to United Kingdom Patent Application No. GB0710188.4, filed May 29, 2007; United Kingdom Patent Application No. GB0710189.2, filed May 29, 2007; U.S. Provisional Application No. 60/940,629, filed May 29, 2007; U.S. Provisional Application No. 60/940,614, filed May 29, 2007; United Kingdom Patent Application No. GB0724426.2, filed Dec. 14, 2007; United Kingdom Patent Application No. GB0724404.9, filed Dec. 14, 2007; U.S. Provisional Application No. 61/014,624, filed Dec. 18, 2007; and U.S. Provisional Application No. 61/014,627, filed Dec. 18, 2007; all of which are hereby incorporated by reference.

FIELD OF DISCLOSURE

This disclosure relates to a magnetic separating device for isolating magnetically labelled particles from a non-magnetic medium.

BACKGROUND TO DISCLOSURE

The use of a high-gradient magnetic field to separate magnetically attractable particles from a fluid in which they are suspended is well known. Moreover, magnetic separation devices are used in a variety of industries including the pharmaceutical, medical agricultural, scientific and engineering fields. For example in biotechnology, a high-gradient magnetic field may be used to separate magnetically labelled bone marrow cells from a blood sample.

WO 90/14891 DYNAL A. S. discloses a conventional magnetic separation device wherein a test-tube, containing a fluid in which magnetically labelled particles are suspended, is arranged adjacent a strong magnet. The labelled particles are magnetically attracted to the side of the test-tube nearest the magnet. Thus, the supernatant is easily removable from the test-tube using a pipette whilst the magnetically labelled particles are left in the tube.

In order to save time, it is often desirable to process a large number of samples at once using a linear rack-like arrangement or tray-like arrangement. For example, the magnetic separating device disclosed in WO 90/14891 DYNAL A. S. comprises a rack for supporting a plurality of specimen containers. Unfortunately, a magnetic separating device having a linear rack or tray configuration takes up a significant amount of space. Moreover, it is difficult to see the sample when the specimen container is mounted in a rack or tray.

A fluid sample may require mixing prior to or during the magnetic separation process. The mixing of a fluid sample is typically achieved by using a mixing apparatus to agitate the fluid sample. Although, mixing apparatus may comprise a plurality of fluid sample vessel chambers to receive and retain a plurality of sample vessels such that a plurality of sample vessels may be agitated simultaneously, the efficiency of the mixing process is restricted. It often takes a significant amount of time to manually transfer and place each sample vessel with a chamber. It will be appreciated that safety is of paramount importance when mixing and handling the sample vessels because the sample vessels may contain dangerous chemicals, potentially infectious materials or radioactive substances. Unfortunately, it has been found that the sample vessels can crack when processed using this particular type of mixing apparatus. Despite every effort to ensure the sample vessels are securely retained within the chambers and also arranged in the chambers such that the load is evenly balanced, there is still the risk that the sample vessels may still crack during mixing.

Accordingly, there is a need to provide a magnetic separation device that can alleviate and/or overcome at least some of the above-mentioned problems. More specifically, the disclosure seeks to provide a magnetic separation device that is suitable for processing a plurality of samples. The disclosure seeks to provide a magnetic separation device that is able to accurately and efficiently separate the magnetically labelled particles in a plurality of samples. The disclosure seeks to provide a magnetic separation device that has a more compact design than comparable devices of the prior art. The present disclosure also seeks to provide a magnetic separation device wherein a plurality of specimen containers mounted in the device are clearly visible so that the inspection of samples is easier than in comparable devices of the prior art. The present disclosure seeks to provide a magnetic separation device whereby a plurality of sample vessels may be simultaneously agitated by a mixing apparatus. The disclosure seeks to provide a magnetic separation device whereby a plurality of sample vessels may be simultaneously agitated by a mixing device whilst remaining in-situ within the device.

BRIEF SUMMARY OF THE DISCLOSURE

According to a first aspect of the disclosure there is provided a magnetic separating device for isolating magnetically labelled particles from a non-magnetic medium comprising:

a body portion having a magnetising portion for providing a magnetic field and a surface by means of which the body portion may stand on a supporting surface; and a sample vessel retaining portion for retaining at least one sample vessel, wherein, the magnetising portion is configured to conform at least approximately to the longitudinal profile of at least a substantial portion of the at least one sample vessel;

the sample vessel retaining portion is configured to retain at least one sample vessel such that at least a portion of the contents of the sample vessel is visible to a user; and the sample vessel retaining portion is configured to be mountable on the magnetising portion so that in use, the at least one sample vessel is subject to the magnetic field of the magnetising portion.

Preferably the magnetising portion comprises at least one magnet.

The at least one magnet may be configured within the magnetising portion such that a main volume of the sample vessel is subject to the magnetic field.

The at least one magnet may be alternatively or further configured within the magnetising portion such that only the tip of the sample vessel is subject to the magnetic field.

Preferably, the sample vessel retaining portion comprises at least one formation configured for receiving and retaining a sample vessel.

Preferably, the sample vessel retaining portion comprises an external wall and an internal wall and the at least one formation is a recess formed in the external wall so as to retain the at least one sample vessel proximate the external wall. Alternatively, the sample vessel retaining portion comprises an external wall and an internal wall and the at least one formation is an aperture extending through the sample vessel retaining portion between the external wall and the internal wall.

The at least one formation may be configured selectively to receive and retain a sample vessel in a first position or a second position, whereby in the first position the sample vessel is arranged with respect to the magnetising portion such that at least a main volume of the sample vessel is subject to the magnetic field and in the second position the sample vessel is arranged with respect to the magnetising portion such that only the tip of the sample vessel is subject to the magnetic field.

Alternatively or additionally, the at least one formation of a first type is formed at a first location and at least one formation of a second type at a second location on the external wall, whereby a sample vessel received and retained in a formation of a first type is arranged with respect to the magnetising portion such that at least a main volume of the sample vessel is subject to the magnetic field and a sample vessel received and retained in a formation of the second type is arranged with respect to the magnetising portion such that only the tip of the sample vessel is subject to the magnetic field.

The magnetising portion preferably comprises an external wall, whereby when the sample vessel retaining portion receives the magnetising portion, the internal wall of the sample vessel retaining portion is in juxtaposition with the external wall of the magnetising portion.

In an embodiment of the disclosure, the internal wall of the sample vessel retaining portion and the external wall of the magnetising portion are substantially cylindrical.

In a further embodiment of the disclosure, the internal wall of the sample vessel retaining portion and the external wall of the magnetising portion are substantially cuboid.

In yet a further embodiment of the disclosure, the internal wall of the sample vessel retaining portion is generally U-shaped and the external wall of the magnetising portion is substantially cuboid, whereby when the said sample vessel retaining portion receives the magnetising portion, the generally U-shaped internal wall of the sample vessel retaining portion is in juxtaposition with a corresponding generally U-shaped portion of the substantially cuboid shaped external wall of the magnetising portion.

Preferably the external wall of the magnetising portion is configured to conform at least approximately to the longitudinal profile of at least a substantial portion of the sample vessel. For example, the external wall may comprise a first portion that is configured to conform at least approximately to the longitudinal profile of the main volume of the sample vessel and a second portion that is configured to conform at least approximately to the longitudinal profile of the tip of the sample vessel.

When the at least one magnet is configured within the magnetising portion such that the main volume of the sample vessel is subject to the magnetic field, the at least one magnet is preferably configured within the magnetising portion to conform at least approximately to the longitudinal profile of the main volume of the sample vessel.

When the at least one magnet is configured within the magnetising portion such that the tip of the sample vessel is subject to the magnetic field, the at least one magnet is preferably configured within the magnetising portion to conform at least approximately to the longitudinal profile of the tip of the sample vessel.

The magnetic separating device may further comprise at least one coupling member to releasably engage the sample vessel retaining portion and the magnetising portion. The coupling member may comprise an O-ring to frictionally engage the sample vessel retaining portion and the magnetising portion.

The surface by means of which the body portion may stand on a supporting surface may be a lower surface of a foot portion and the magnetic separating device may optionally further comprise a rotatable mounting member, such as a ball bearing and socket arrangement, to rotatably mount the magnetising portion with respect to the foot portion.

The magnetic separating device may further comprise releasable engaging means whereby the sample vessel retaining portion can be mounted at any selected one of a range of mounting positions on the magnetising portion.

The magnetic separation device may comprise a further body portion having a non-magnetising portion and a surface by means of which the further body portion may stand on a supporting surface and wherein the sample vessel retaining portion is configured to be mountable on the non-magnetising portion.

In a second aspect of the disclosure, there is provided a magnetic separating device for isolating magnetically labelled particles from a non-magnetic medium comprising:

a body portion having a male magnetising portion for providing a magnetic field and a foot portion; and a female sample vessel retaining portion for retaining at least one sample vessel;

wherein, the male magnetising portion is configured to conform at least approximately to the longitudinal profile of at least a substantial portion of the at least one sample vessel;

the female sample vessel retaining portion is configured to receive the male magnetising portion so that the female sample vessel retaining portion is mountable on the male magnetising portion; and the female sample vessel retaining portion is configured to retain at least one sample vessel such that it in use, the at least one sample vessel is subject to the magnetic field of the male magnetising portion.

In a third aspect of the disclosure, there is provided a kit of parts for a magnetic separation device comprising:

a body portion having a magnetising portion for providing a magnetic field and a surface by means of which the body portion may stand on a supporting surface; and a plurality of sample vessel retaining portions for retaining at least one sample vessel, wherein, the magnetising portion is configured to conform at least approximately to the longitudinal profile of at least a substantial portion of the at least one sample vessel;

each respective sample vessel retaining portion is configured to retain at least one sample vessel such that at least a portion of the contents from the sample vessel is visible to a user; and each respective sample vessel retaining portion is configured to be mountable on the magnetising portion so that it use, the at least one sample vessel of a predetermined size is subject to the magnetic field of the magnetising portion.

The kit of parts may also comprise a further body portion having a non-magnetising portion and a surface by means of which the further body portion may stand on a supporting surface and wherein each respective sample vessel retaining portion is configured to be mountable on the non-magnetising portion.

In a fourth aspect of the disclosure, there is provided a method of isolating magnetically labelled particles from a non-magnetic medium using the magnetic separation device of the first aspect of the disclosure comprising the steps of:

(i) mounting the sample vessel retaining portion on the magnetising portion;

(ii) subjecting a sample having magnetically labelled particles, contained within at least one sample vessel retained in the sample vessel retaining portion, to the magnetic field of the magnetising portion;

(iii) removing the non-magnetic supernatant.

The method may further include the initial steps of:

(iv) placing a sample and magnetic labelling means, to magnetically label particles of interest, within at least one sample vessel;

(v) retaining the at least one sample vessel in the sample vessel retaining means;

(vi) mounting the sample vessel retaining means on the non-magnetising portion for an incubation time period;

(vii) dismounting the sample vessel retaining means from the non-magnetising portion after the incubation time period when the particles of interest are magnetically labelled.

In a fifth aspect of the disclosure there is provided a magnetic separation device comprising:

a sample vessel retaining portion having at least one formation configured to receive and retain a sample vessel; and at least one protruding member configured to be contactable with a mixing apparatus so that when the least one protruding member is arranged in contacting relationship with the mixing apparatus, a fluid sample of the at least one sample vessel may be subject to an agitating motion of the mixing apparatus and thereby mixed by the mixing apparatus;

a body portion having:

a surface by means of which the body portion may stand on a supporting surface;

at least one cavity to receive and retain the at least one protruding member so that the sample vessel retaining portion may be mounted on the body portion; and a magnetising portion for providing a high-gradient magnetic field so that when the sample vessel retaining portion is mounted on the body portion, the fluid sample of at least one sample vessel is subject to a high-gradient magnetic field.

Preferably, the at least one protruding member is configured to be contactable with an agitating plate of the mixing apparatus so that the agitating motion may be transmitted to the fluid sample of the at least one sample vessel. Alternatively, the at least one protruding member is configured to be contactable with an intermediate member, that is coupled to an agitating plate of the mixing apparatus, so that the agitating motion may be transmitted to the fluid sample of the at least one sample vessel. Or, the at least one protruding member is configured to be received and retained by an agitating cavity and/or a protruding member retaining portion of the mixing apparatus so that the agitating motion may be transmitted to the fluid sample of the at least one sample vessel.

The agitating motion of the mixing apparatus may be is an oscillating motion and/or a vibrating motion.

The at least one protruding member preferably protrudes substantially perpendicularly from a lower surface of the sample vessel retaining portion.

The magnetic separation device may further comprise at least one surface by means of which the sample vessel retaining portion may stand on a supporting surface.

BRIEF DESCRIPTION OF THE DRAWINGS

For a better understanding of the present disclosure and to show how it may be carried into effect, reference will be made, by way of example only, to the following drawings in which.

DETAILED DESCRIPTION

Figure 1:
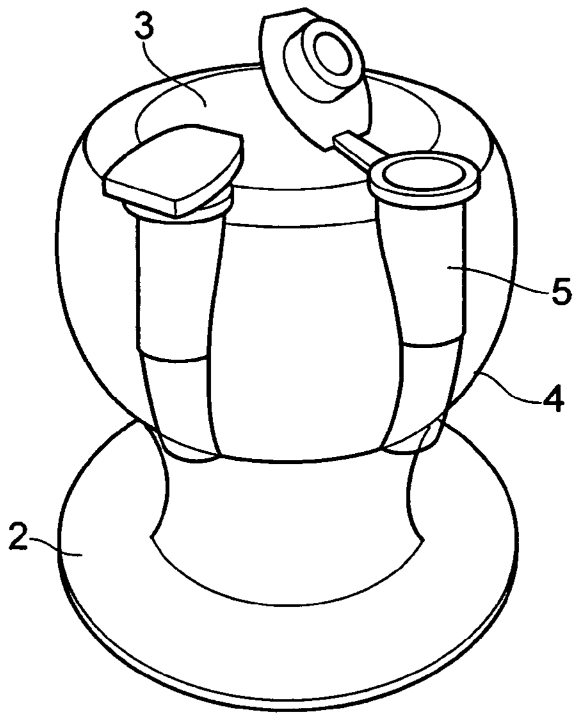
FIG. 1 is a perspective view of a magnetic separating device according to a first embodiment of the disclosure.

Referring now in particular to FIGS. 1 to 8 in the illustrated embodiments of the disclosure, the first, second, third, fourth and fifth aspects of the disclosure relate to a magnetic separating device that comprises of a body portion (1) having a foot portion (2) and a magnetising portion (3), a sample vessel retaining portion (4) and at least one sample vessel (5).

Figure 2:
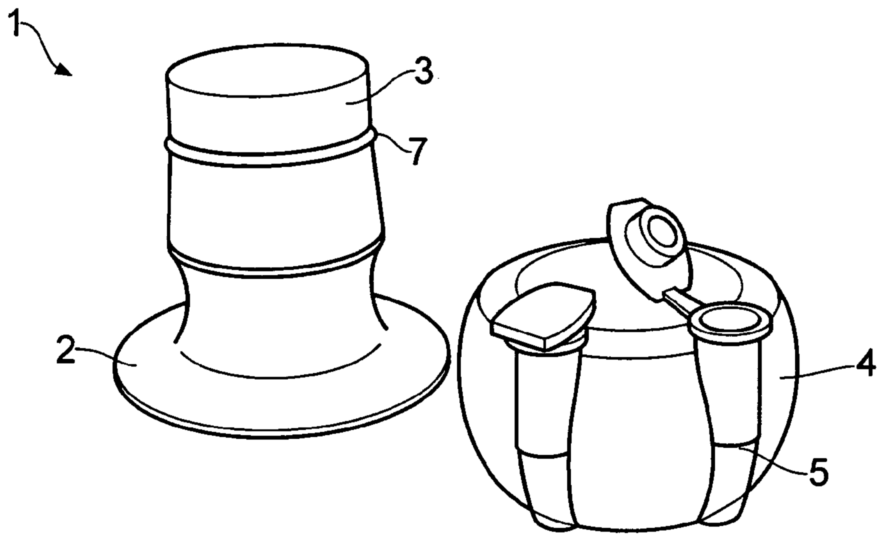
FIG. 2 is a perspective view of a body portion and a sample vessel retaining portion of the magnetic separating device of FIG. 1.
Figure 3:
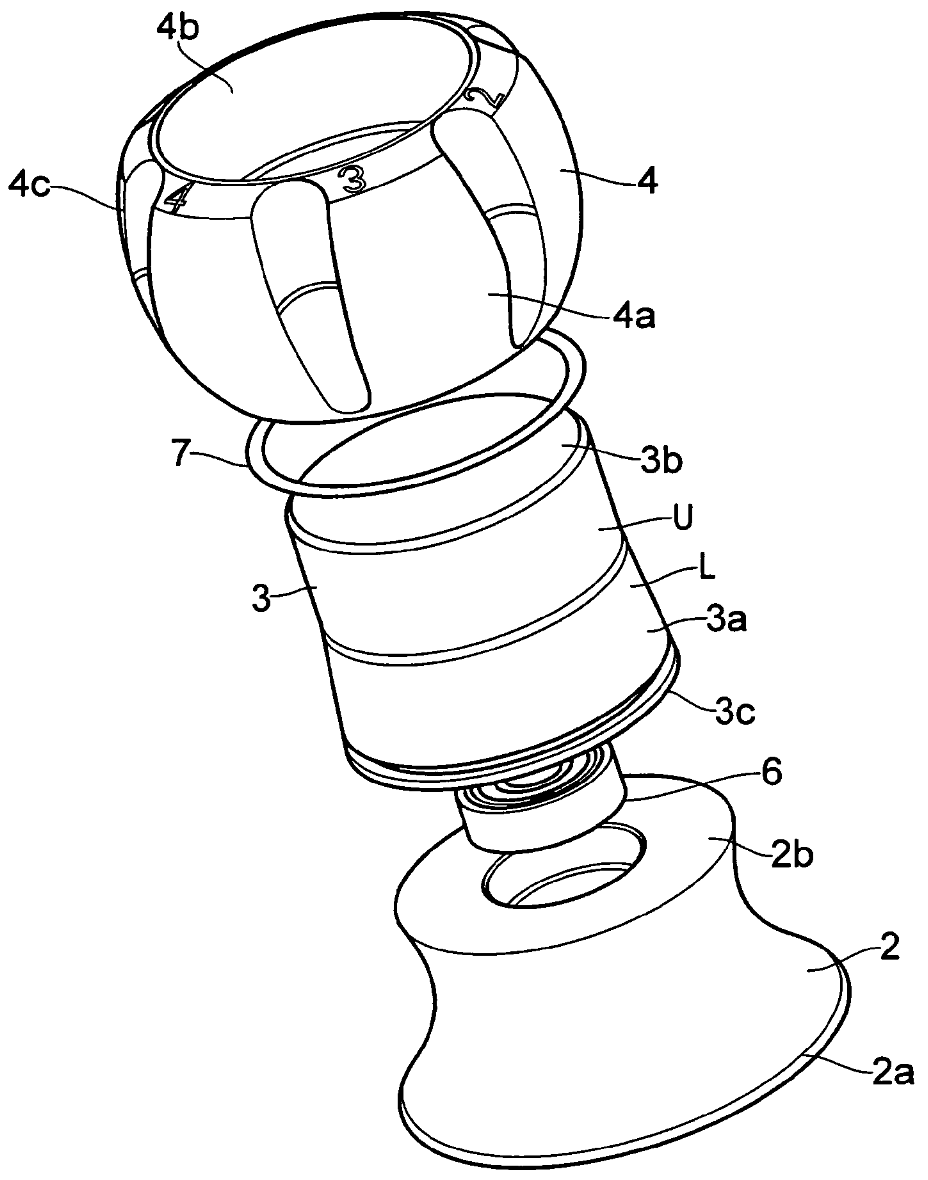
FIG. 3 is a schematic, exploded, perspective view of magnetic separating device of FIG. 1.
Figure 7A:
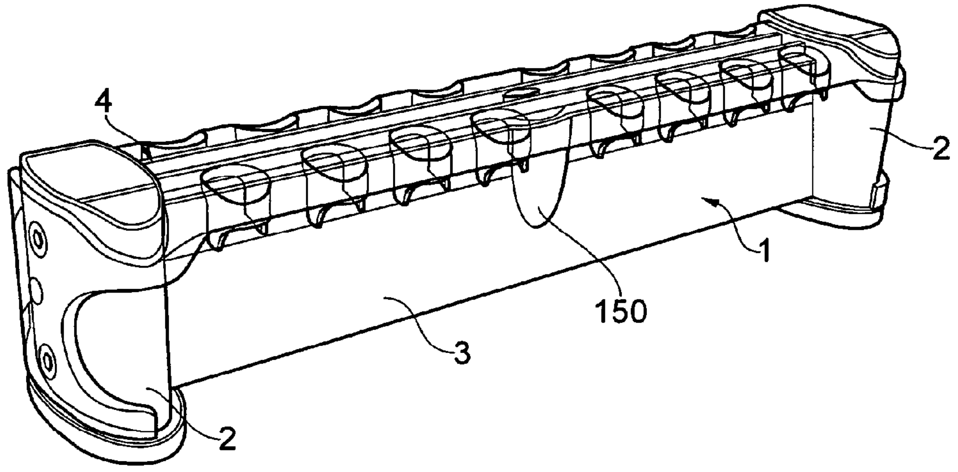
FIG. 7*a* is a perspective view of a magnetic separation device according to a fourth embodiment of the disclosure.
Figure 7B:
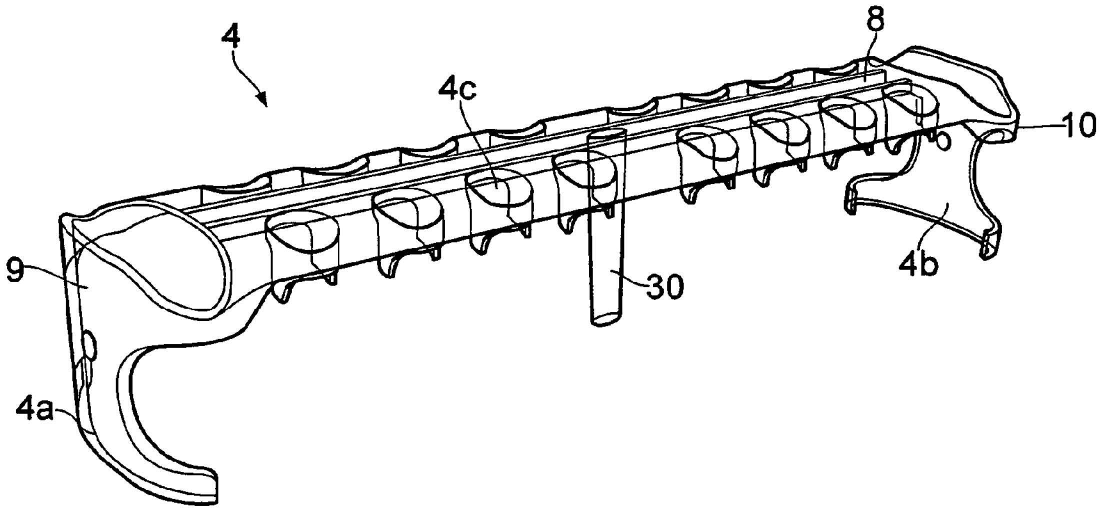
FIGS. 7*b* and 7*c* are perspective views of the sample vessel retaining portion and the body portion respectively of the magnetic separation device according to the fourth embodiment of the disclosure.
Figure 7C:
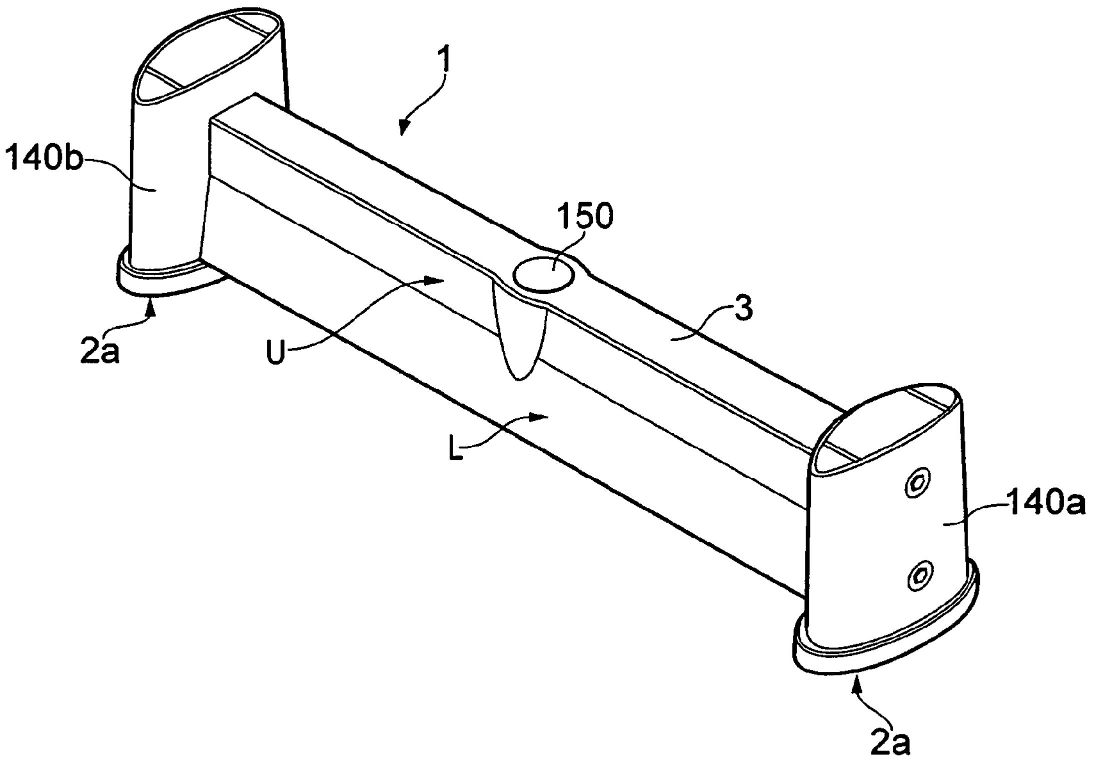
Figure 8:
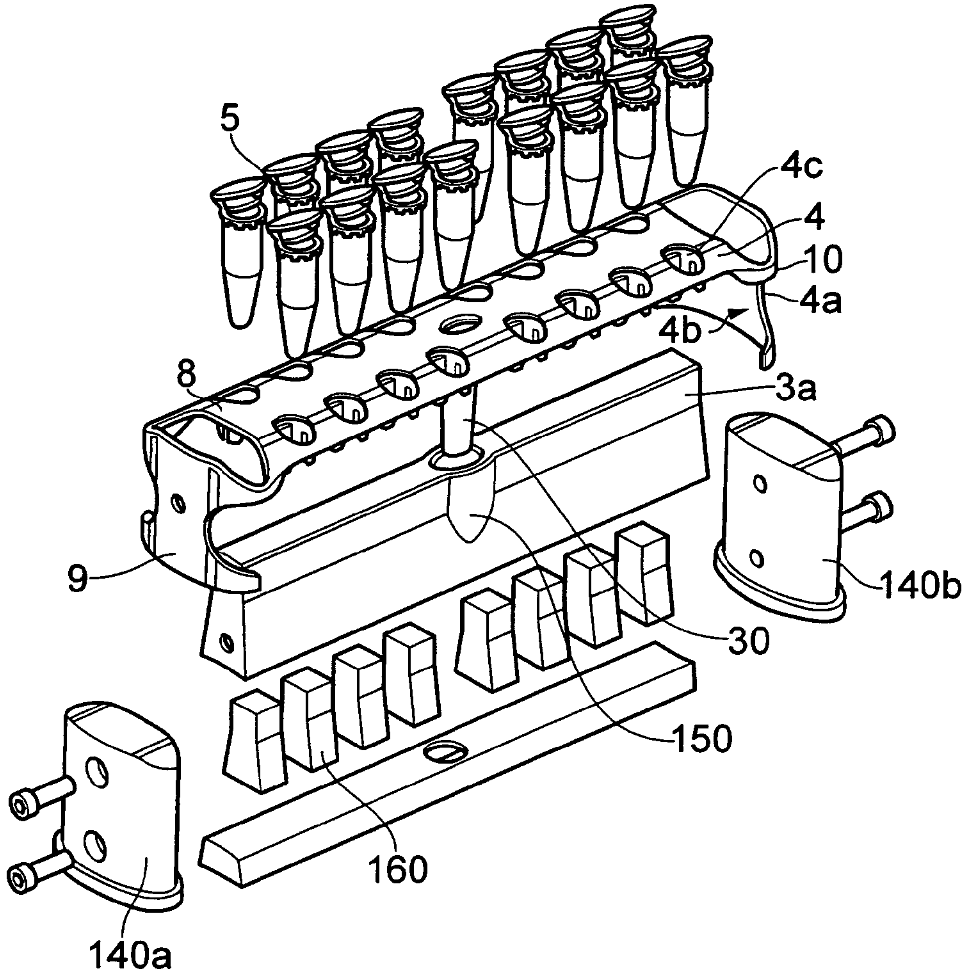
FIG. 8 is an exploded perspective view of the magnetic separation device according to the fourth embodiment of the disclosure.

The foot portion (2) is configured to stand on a supporting surface such as a work station, shelf, table or the like. In its simplest form, the foot portion (2) may be a surface by which the body portion (1) may stand on a supporting surface. In the embodiment depicted in FIGS. 1 to 8, the foot portion comprises a lower surface (2*a*) that is configured to stand on a supporting surface. The foot portion (2) and magnetising portion (3) may be separate elements. The foot portion (2) and magnetising portion (3) may be releasably coupled. The foot portion (2) may comprise an upper surface (2*b*) that is arranged in confronting relation with a lower surface (3*c*) of the magnetising portion (3) as shown in FIG. 3. The foot portion (2) and magnetising portion (3) may be provided as a unitary component as shown in FIGS. 5*a* to 6*b*. The foot portion (2) may be provided as multiple components. In FIGS. 7*a* to 8, the foot portion comprises a first foot member (140*a*) and a second foot member (140*b*). The magnetising portion (3) is arranged between the first foot member (140*a*) and the second foot member (140*b*). The feet members (140*a*, 140*b*) are arranged in juxtaposition with two opposing side walls of a housing of the magnetising portion (3). Each foot member (140a, 140b) comprises a lower surface (2a) that is configured to stand on a supporting surface, an inner wall that is arranged in confronting relation with a side wall of the housing of the magnetising portion and an outer side wall that is configured such that it may be arranged in confronting relation with the inner surface of the side walls of the sample vessel retaining portion (4).

The magnetising portion (3) comprises at least one magnet. The at least one magnet provides a high-gradient magnetic field that is suitable for attracting and separating magnetically labelled particles from a fluid in which they are suspended. The at least one magnet may be made of a ferromagnetic material such as iron, steel, cobalt-nickel etc. The at least one magnet may be a permanent magnet. The at least one magnet is preferably a high-energy neodymium permanent magnet. More specifically, the at least one magnet is preferably formed from a high performance rare earth alloy such as neodymium iron boron (NdFeB). Alternatively, the at least one magnet of the magnetising portion (3) may be an electro-magnet.

The magnetising portion comprises a housing. The at least one magnet is mounted within the housing which defines a void, cavity or chamber for receiving the at least one magnet. The housing has an external wall which may comprise at least one side-wall that extends between a top margin, point or boundary of the housing and a bottom margin, point or boundary of the housing. In the embodiment depicted in FIGS. 1 to 4b, the housing of the magnetising portion (3) has a closed cylinder-like shape with a side-wall (3a), an upper surface (3b) and a lower surface (3c). In the embodiments depicted in FIGS. 5a to 8, the housing of the magnetising portion (3) has a closed cuboid-like shape with four side walls (3a), an upper surface (3b) and a lower surface (3c).

The magnetising portion (3) may be rotatable with respect to the foot portion (2). The body portion (1) may comprise a rotatable mounting member to rotatably mount the magnetising portion (3) with respect to the foot portion (2). The rotatable mounting member may be any conventional means suitable for rotatably mounting the magnetising portion. For example, FIG. 3 indicates the rotatable mounting member may be a ball-bearing and socket arrangement (6) disposed between a void or recess formed in the lower surface (3c) of the magnetising portion (3) and a void or recess in the upper surface (2b) of the foot portion (2).

Clearly, the foot portion (2) and housing of the magnetising portion must be made of a material or materials that are non-magnetic. The foot portion (2) and housing of the magnetising portion are preferably made from the same material and/or a material that is easy to clean and resistant to disinfectant and/or other aggressive chemicals. For example, the foot portion (2) and housing of the magnetising portion may be made from a plastics material such as an ABS plastic.

The sample vessel retaining portion (4) is suitable for retaining at least one sample vessel (5). The sample vessel retaining portion (4) is configured such that it may receive and thereby be mounted on the magnetising portion (3). The sample vessel retaining portion (4) is releasably mountable on the magnetising portion (3). As the sample vessel retaining portion (4) receives the magnetising portion (3) the sample vessel retaining portion (4) is externally mounted on the body portion (1). In its simplest form the sample vessel retaining portion (4) is a female part that is configured to receive the male magnetising portion (3).

When the sample vessel retaining portion (4) receives the magnetising portion (3) a sample vessel (5) retained by the sample vessel retaining portion (4) is arranged in close proximity to the magnetising portion (4) such that it is subject to a high-gradient magnetic field. In the embodiments depicted in FIGS. 1a to 8 it can be seen that the sample vessel is arranged in close proximity and in confronting relation to at least one side wall (3a) of the external wall of the magnetising portion. By arranging the sample vessel in close proximity to the magnetising portion the magnetically labelled particles suspended within the sample are attracted by the magnetising portion (3) and are immobilised at selected regions along the interior of the sample vessel (5). These selected regions are sections or zones of the interior surface of the sample vessel (5) adjacent the magnetising portion; i.e. regions of the interior surface closest to the at least one magnet mounted within the magnetising portion.

As mentioned above, the magnetising portion (3) comprises at least one high-gradient magnet. The at least one magnet is mounted within the housing of the magnetising portion (3) such that when the at least one sample vessel (5) is mounted on the sample vessel retaining portion (4) the sample vessel is subject to a high-gradient magnetic field. The at least one magnet may be shaped and arranged such that at least the main volume of the sample vessel is subject to a high-gradient magnetic field. The at least one magnet may be shaped and arranged such that the main volume and the tip of the sample vessel are subject to a high-gradient magnetic field. In another embodiment of the disclosure, at least a first magnet may be configured within the housing to subject the main volume of a sample vessel to a high-gradient magnetic field and at least a second magnet may be configured within the housing to subject the tip of the sample vessel to a high-gradient magnetic field. Alternatively, the at least one magnet may be shaped and arranged within the housing of the magnetising portion such that only the tip of the sample vessel is subject to a high-gradient magnetic field.

Figure 9A:
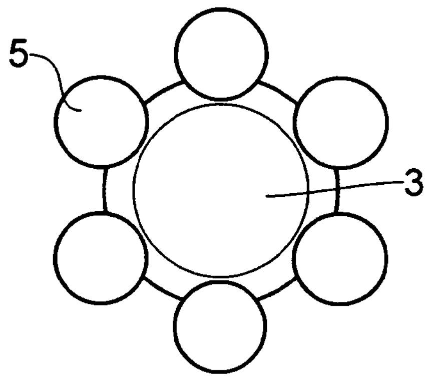
FIG. 9*a* is a plan view and FIGS. 9*b* and 9*c* are side-views showing an arrangement of two sample vessels with respect to the magnetising portion.
Figure 9B:
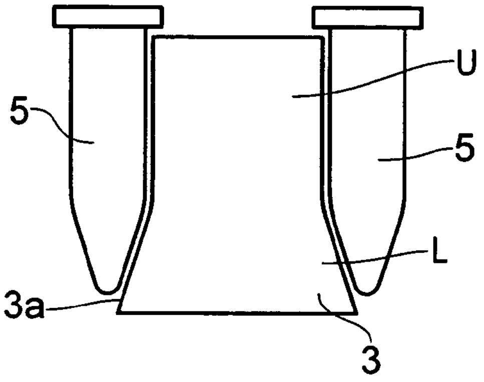

In the first, second, third and fourth aspects of the disclosure, the magnetising portion of the magnetic separation device is configured to conform at least approximately to at least a substantial portion of the longitudinal profile of at least a sample vessel. In the fifth aspect of the disclosure the magnetising portion is optionally configured to conform at least approximately to at least a substantial portion of the longitudinal profile of at least a substantial portion of the at one sample vessel. Preferably, the external wall of the housing is configured to conform at least approximately to at least a substantial portion of the sample vessel. More specifically, the at least one side wall (3a) of the external wall that is arranged in confronting relation with the sample vessel is configured to conform at least approximately to at least a substantial portion of the longitudinal shape of the sample vessel. The external wall may comprise a first portion that is configured to conform at least approximately to the longitudinal profile of the main volume of a sample vessel and a second portion that is configured to conform at least approximately to the longitudinal profile of the tip of a sample vessel. FIGS. 9a and 9b depict how a plurality of sample vessels (5) may be arranged circumferentially with respect to a magnetising portion (3) that has been configured to conform at least approximately to the shape of the sample vessels. The external wall of the magnetising portion (3) is configured such that it follows the contours of, that is it conforms to, the profile of the sample vessels. The external wall comprises an upper wall portion (U) that is substantially vertical that conforms at least approximately to the profile of the main volume region of the sample vessels. The external wall also comprises a lower wall portion (L) that is inclined with respect to the upper wall portion and conforms at least approximately to the profile of the tip region of the sample vessels. The external wall of the magnetising portion (3) depicted in the embodiments of FIGS. 1*a*-8 comprises an upper portion (U) that is substantially vertical and conforms at least approximately to the profile of the main volume region of the sample vessels and a lower portion (L) that is inclined with respect to the upper wall portion and conforms at least approximately to the profile of the tip region of the sample vessels.

Figure 9C:
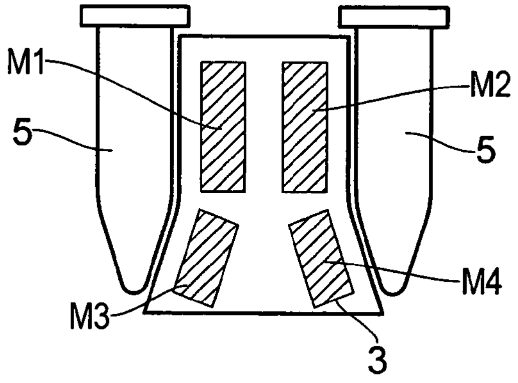
Figure 10A:
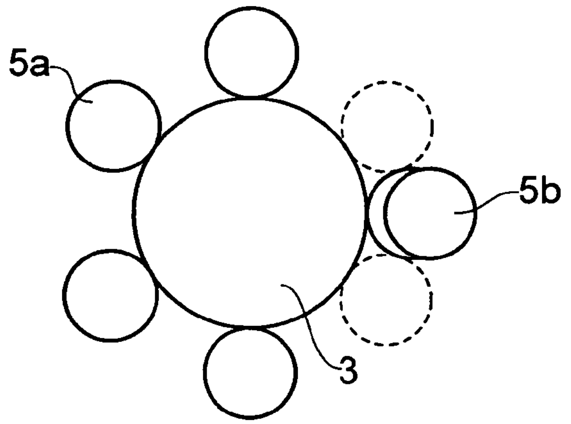
FIGS. 10*a* and 10*b* are a plan view and side-view respectively showing an alternative arrangement of two sample vessels with respect to the magnetising portion.
Figure 10B:
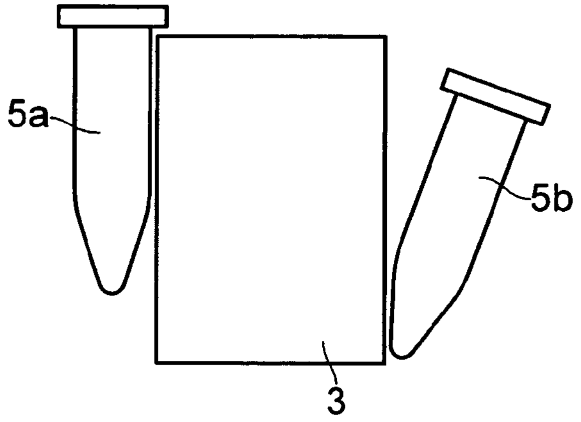
Figure 11A:
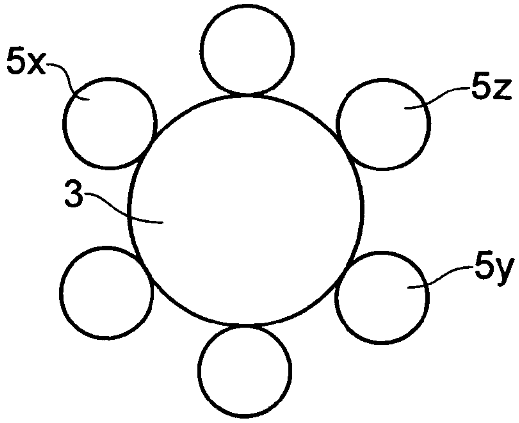
FIGS. 11*a* and 11*b* are a plan view and side-view respectively showing a further alternative arrangement of three sample vessels with respect to the magnetising portion.
Figure 11B:
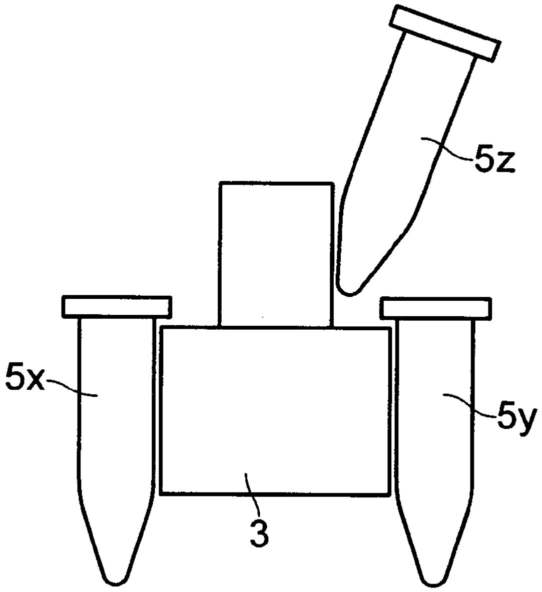

The magnetising portion may alternatively or additionally be configured to conform at least approximately to at least a substantial portion of the longitudinal profile of at least one sample vessel by arranging and/or shaping the at least one magnet located within the housing of the magnetising portion (3). The at least one magnet may be arranged and/or shaped such that at least one face of the at least one magnet conforms at least approximately to at least a substantial portion of the longitudinal profile of the sample vessel. The magnet may be arranged and/or shaped such that it has a face which follows the contours or profile of the longitudinal profile of the main volume and/or tip of the sample vessel. FIG. 9*c* depicts a plurality of sample vessels (5) arranged circumferentially around a magnetising portion (3) whereby both the external wall and the magnets have been configured to conform at least approximately to at least a substantial portion of the longitudinal profile of the sample vessels. FIG. 9*c* shows how a plurality of magnets may be arranged and shaped within a housing of a magnetising portion (3) with respect to a plurality of sample vessels such that they conform at least approximately to the longitudinal contour or profile of the sample vessels. A first group of magnets (M1, M2) is arranged and shaped within an upper portion of the housing of the magnetising portion (3) such a face of each magnet conforms at least approximately to the longitudinal profile of the main volume region of the sample vessels. A further second group of magnets (M3, M4) are arranged and shaped within the lower portion of the housing of the magnetising portion (3) such that a face of each magnet conforms at least approximately to the longitudinal profile of the tip region of a sample vessel. Alternatively, the magnets (160) of a magnetising portion (3) may be arranged and shaped as shown in FIG. 8. Here, each magnet (160) comprises an upper portion that is substantially vertical and conforms to the longitudinal profile of the main volume of a sample vessel and a lower portion that is inclined with respect to the upper portion and conforms to the longitudinal profile of the tip of the sample vessel.

Configuring the magnetising portion to conform at least approximately to at least a substantial portion of the longitudinal profile of at least one sample vessel alleviates and/or overcomes some of the problems associated with prior art magnetic separation devices. By configuring the magnetising portion such that the external wall and/or at least one magnet conforms at least approximately to at least a substantial portion of the longitudinal profile of a sample vessel, a sample vessel (retained in the sample vessel retaining portion when mounted on the magnetising portion) is subject to an improved high-gradient magnetic field. The sample vessel is subject to a higher-gradient magnetic field than the prior art because the sample vessel is arranged in closer proximity to the magnetising portion. Moreover, a greater portion of the sample vessel is subject to the higher-magnetic field because a more substantial length of at least one sample vessel is arranged in closer proximity to the magnetising portion than in the prior art. For example, both the main volume and the tip of the sample vessel are arranged in closer proximity to the magnetising portion. As a result, the high-gradient magnetic field is more consistent along a substantial length of the sample vessel (e.g. the main volume and the tip). Since the sample vessel is subject to an improved to a higher-gradient magnetic field and a more substantial length of the sample vessel is subject to a more consistent high-gradient magnetic field, magnetically labelled particles may be attracted by the magnetising portion from all parts of the sample and the selected regions of immobilised magnetically labelled particles may be found along the interior surface of a substantial length of the sample vessel. Also, it has been found that by specifically configuring the magnetising portion such that it conforms at least approximately to the longitudinal profile of the tip of the at least one sample vessel, the magnetic separation of magnetically labelled particles in small sample volumes is improved. Due to the configuration of the magnetising portion the accuracy and efficiency of the magnetic separation device is improved.

The sample vessel retaining portion (4) has both an external wall (4*a*) and an internal wall (4*b*). The external wall (4*a*) of the sample vessel retaining portion may be shaped and configured such that it comprises at least one side-wall extending between a top margin or boundary and a bottom margin or boundary. For example, the sample vessel retaining portion (4) may have an open cylinder-like shape with an aperture extending from the top to the bottom so as to define the external and internal walls (4*a*, 4*b*) (see FIGS. 2 and 3). In the embodiment of the disclosure depicted in FIGS. 1 to 4*b* the external wall (4*a*) comprises a curved side-wall.

The sample vessel retaining portion (4) may be alternatively shaped and configured such that the internal wall (4*b*) defines a recess or cavity space to receive the magnetising portion (3).

Figure 5B:
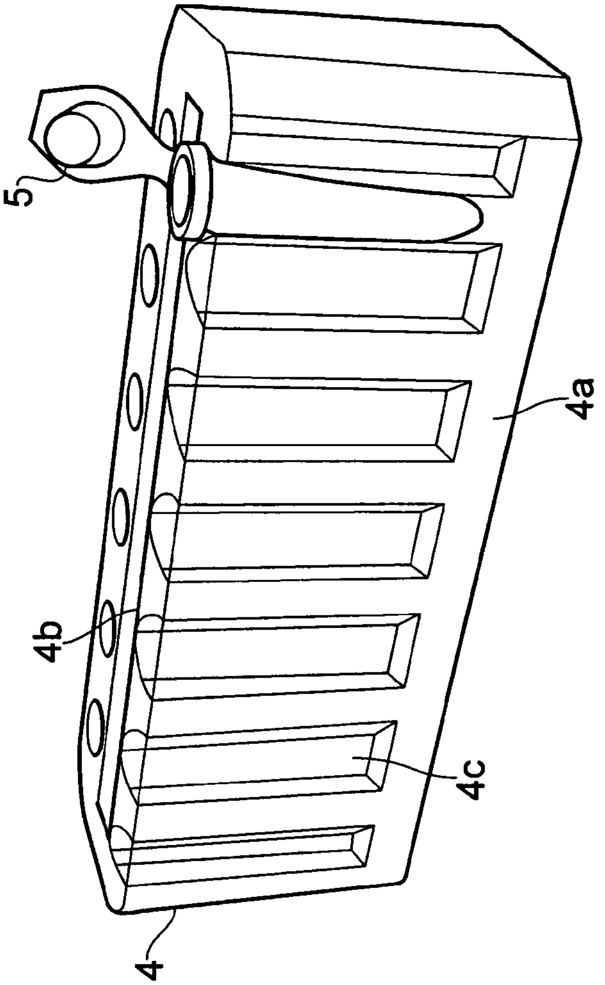
FIGS. 5*a* and 5*b* are an exploded perspective view and a perspective view respectively of a magnetic separating device according to a second embodiment of the disclosure.
Figure 5A:
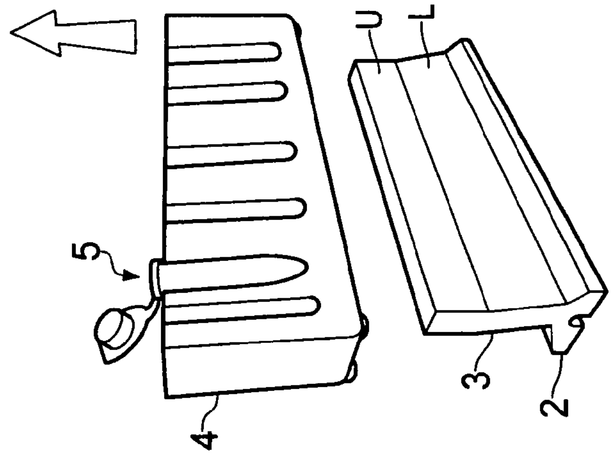

In the embodiment of the disclosure depicted in FIGS. 5*a* and 5*b*, the sample vessel retaining portion (4) has a housing-like structure with an open cuboid-like shape. This particular sample vessel retaining portion (4) has an aperture extending from the top to the bottom of four side walls so as to define the external and internal walls (4*a*, 4*b*).

In the embodiments of the disclosure depicted in FIGS. 6*a* and 6*b* and FIGS. 7*a*-8, the sample vessel retaining portion (4) has a frame-like structure that is generally U-shaped. The sample vessel retaining portion (4) comprises a cross-member (8), a first side-wall (9) extending substantially from a first end of the cross-member (8) and a second side-wall (10) extending substantially orthogonally from a second end of the cross-member (8). The upper surface of the cross-member (8) and outer-surfaces of the side-walls (9, 10) define the external wall (4*a*) of the sample vessel retaining portion (4). The lower surface of the cross-member (8) and inner surfaces of the side-walls (9, 10) define the internal wall (4*b*) of the sample vessel retaining portion (4).

When the female sample vessel retaining portion (4) receives the male magnetising portion (2) the internal wall (4*b*) of the sample vessel retaining portion (4) is in juxtaposition with the external wall of the magnetising portion (3). For example in the embodiment depicted in FIGS. 1 to 4*b*, the internal wall (4*b*) of the open cylinder-like sample vessel retaining portion (4) is located in juxtaposition with the side-wall (3*a*) of the closed cylinder-like magnetising portion (3). Likewise, in the embodiment depicted in FIGS. 5*a* and 5*b*, the internal wall (4*b*) (inner surface of the four side walls) of the open cuboid-like sample vessel retaining portion (4) is located in juxtaposition with the four side walls (3*a*) of the closed cuboid-like magnetising portion (3). Moreover, in the embodiment depicted in FIGS. 6*a* and 6*b*, the internal wall (4*b*) (lower surface of the cross-member (8) and inner surface of the side-walls (9, 10) of the generally U-shaped sample vessel retaining portion (4)) is located in juxtaposition with the upper surface 3*b* and two opposing side walls (3*a*), i.e. a certain portion of the external wall of the closed cuboid-like magnetising portion (3). In the embodiment depicted in FIGS. 7*a*-8, the internal wall (4*b*) of the sample vessel retaining portion (4) is located in juxtaposition with the outer walls of the feet members (140*a*,140*b*) and the upper surface of the magnetising portion (3).

The magnetic separating device may further comprise at least one coupling member which serves to releasably secure the female sample vessel retaining portion (4) to the male magnetising portion (4). The coupling member may comprise conventional latching means, snap-fitting means or spring-lock mechanism to mechanically engage the portions. The coupling member may alternatively or further comprise conventional means by which the portions are frictionally engaged. FIGS. 2 and 3 depict an O-ring (7) mounted on the side-wall (3*a*) of the magnetising portion (3) such that the female sample vessel retaining portion (4) and male magnetising portion (3) frictionally engage when the female sample vessel retaining portion (4) receives the male magnetising portion (3).

The magnetic separating device may comprise a releasable engaging means whereby the sample vessel retaining portion (4) can be mounted at any selected one of a range of mounting positions on the magnetising portion (3). By having a range of different mounting positions, the arrangement of the at least one sample vessel (5) retained within the sample vessel retaining portion (4) varies with respect to the magnetising portion (3). Hence, different portions of the at least one sample vessel (5) may be subject to the high-gradient magnetic field when the sample vessel retaining portion (4) is mounted in different positions on the magnetising portion (3). For example, the sample vessel retaining portion (4) may be mountable in three different positions on the magnetising portion such that in a first position only the tip of the at least one sample vessel is subject to a high-gradient magnetic field, in a second position both the tip and the main volume of the at least one sample vessel is subject to a high-gradient magnetic field and in a third position only the main volume of the at least one sample vessel is subject to a high-gradient magnetic field. The releasable engaging means may comprise conventional latching means or snap-fitting means to mechanically engage the sample vessel retaining portion (4) and magnetising portion (3) in the selected position.

The sample vessel retaining portion (4) comprises at least one formation (4*c*) for receiving and retaining a sample vessel (5). Preferably, the sample vessel retaining portion comprises a plurality of formations (4*c*) for receiving and retaining sample vessels (5). The at least one formation (4*c*) may be configured to provide an interference fit between the sample vessel (5) and sample vessel retaining portion (4)

In the embodiments depicted in FIGS. 1 to 5*b*, the at least one formation (4*c*) is formed in the external wall (4*a*) of the sample vessel retaining portion (4). The at least one formation (4*c*) is a recess formed on the external wall (4*a*) of the sample vessel retaining portion (4). The recess is shaped and arranged to receive and retain a sample vessel (5). The recess comprises a face which conforms at least approximately to the shape of a sample vessel. The recess is configured to provide an interference fit and/or friction fit between the sample vessel (5) and the sample vessel retaining portion (4). The recess may be configured to receive and thereby retain a certain portion of the sample vessel or a substantial portion of the sample vessel. When a sample vessel (5) is received and retained by a recess-type formation it is considered to be mounted in the formation (4*c*) proximate the external wall of the sample vessel retaining portion (4).

FIGS. 6*a* to 8 depict embodiments of the disclosure wherein the at least one formation (4*c*) is formed in the cross-member (8) of the sample vessel retaining portion (4). The at least one formation (4*c*) is an aperture that extends through the cross-member between the external wall (4*a*) and the internal wall (4*b*) of the sample vessel retaining portion (4). The aperture may be configured such that a rim of a sample vessel (5) of a predetermined width abuts the peripheral edge of the aperture such that the sample vessel (5) is mounted or retained at the cross-member (8). The sample vessel (5) may be further or alternatively supported by the body portion (1). The body portion (1), specifically the magnetising portion (3) and/or the foot portion (2), is configured such that the tip of the sample vessel (5) may abut the body portion (1) and thereby be supported by the body portion (1). When a sample vessel (5) is received and retained by an aperture-type formation it is considered to be mounted via the formation (4*c*) of the sample vessel retaining portion (4).

Figure 4A:
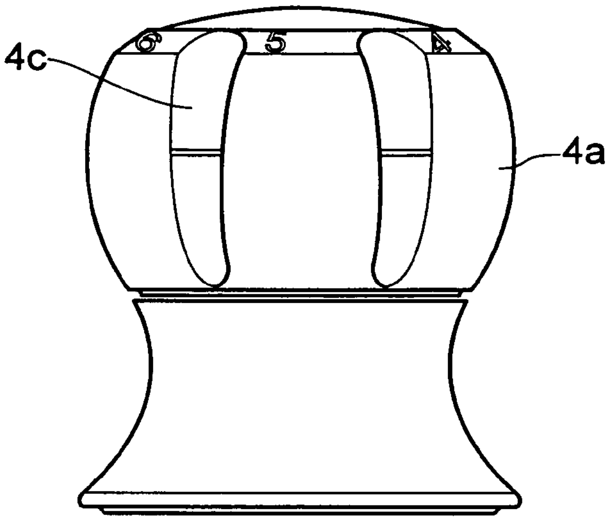
FIGS. 4*a* and 4*b* are a side-view and plan view respectively of the magnetic separating device of FIG. 1.
Figure 4B:
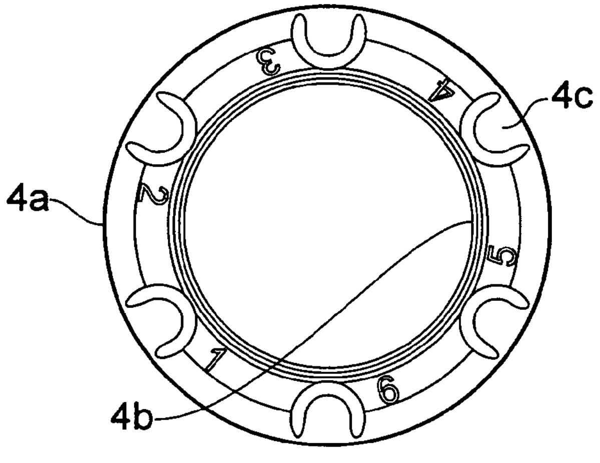

The formations (4*c*) may be arranged in a one dimensional array or a two dimensional array. For example, the sample vessel retaining portion may comprise a single row (one dimensional linear array) of formations. Alternatively, the sample vessel retaining portion may comprise two rows of formations or a plurality of formations arranged in rows and columns (two dimensional array). In preferred configurations, the formations (4*c*) are arranged in approximately circumferential array about the sample vessel retaining portion (4) and are preferably further configured so that the contents of the sample vessels may easily be observed by a user without removing the sample vessels from the respective formations (4*c*). In the embodiment shown in FIGS. 1 to 4*b*, the sample vessel retaining portion (4) may hold up to six sample vessels around the circumference of the cylindrical external wall (4*a*). Thus, when the sample vessel retaining portion (4) receives the magnetising portion (3), the sample vessels (5) are thereby arranged around the circumference of the magnetising portion (3). Of course, the sample vessel retaining portion (4) may be configured to hold fewer or more sample vessels (5). In FIGS. 4*a* and 4*b*, it can be seen that the formations (4*c*) to receive and retain the sample vessels are numbered one to six. In the embodiments shown in FIGS. 5*a* to 8, a plurality of sample vessels (5) may be arranged in approximately circumferential array around the sample vessel retaining portion (4) such that they are arranged in approximately circumferential array around the cuboid-like shaped magnetising portion (3).

The formations (4*c*) to receive and retain a sample vessel may be configured such that the magnetic separating device is suitable for use with a range of different sized sample vessels. The sample vessel retaining portion (4) may be sized and shaped to retain sample vessels of any conventional size and in particular sample vessels having a diameter up to 30 mm and volumes typically ranging from about 5 to about 50 ml. Alternatively, the sample vessel retaining portion (4) may be configured to retain much smaller vessels, for example 0.5 to 2.0 ml micro centrifuge tubes available from Eppendorf A. G., Hamburg, Germany. The sample vessel retaining portion (4) may be colour coded according to size and/or type of sample vessel (5) it is configured to receive and retain.

As mentioned above, the formations (4*c*) may be configured to receive and retain sample vessels (5) from a selected range of different sized sample vessels. Thus, the magnetic separating device may comprise a plurality of sample vessel retaining portions (4) whereby each respective sample vessel retaining portion is configured to retain at least one sample vessel (5) of a predetermined size. The formations (4*c*) of the sample vessel retaining portions depicted in FIGS. 1 to 8 are configured to receive and retain micro-centrifuge tubes (Eppendorf tubes).

The at least one formation (4*c*) may be configured on the sample vessel retaining portion (4) such that a sample vessel (5) may be received and retained in a first position or a second position within the formation. When a sample vessel (5) is retained in a first position and the sample vessel retaining portion (4) is mounted on the magnetising portion (3), the sample vessel may be mounted with respect to the magnetising portion such that at least the main volume of the sample vessel is subject to a high-gradient magnetic field. In the first position only the main volume or both the main volume and the tip of the sample vessel may be subject to the magnetic field. When the sample vessel (5) is retained in a second position on the sample vessel retaining portion (4) and the sample vessel retaining portion is mounted on the magnetising portion (3), the sample vessel may be mounted with respect to the magnetising portion such that only the tip of the sample vessel is subject to a high-gradient magnetic field. FIGS. 8*a* and 8*b* depict an embodiment of the disclosure whereby a first sample vessel (5*a*) is retained in a first position within a formation such that both the main volume and tip are subject to the high-gradient magnetic field created by the magnetising portion (3) and a second sample vessel (5*b*) is retained in a second position within a formation such that only the tip of the sample vessel is subject to the high-gradient magnetic field.

The at least one formation (4*c*) may also or alternatively be configured on the sample vessel retaining portion (4) such that a sample vessel (5) may be received in different locations. The formations may be configured such that the sample vessel may be received at different locations relative to the magnetising portion (3) when the sample vessel retaining portion (4) is mounted on the magnetising portion. For example, a formation may be formed at a first location on the sample vessel retaining portion such that at least the main volume of the sample vessel is subject to a high gradient magnetic field. Alternatively, a formation may be formed at a second location on the sample retaining portion such that only the tip of the sample vessel is subject to a high-gradient magnetic field. FIGS. 9*a* and 9*b* depict an embodiment of the disclosure where a first and second sample vessel (5*x*,5*y*) are received and retained in a first location on the external wall of the sample vessel retaining portion (3) such that only the main volume of the sample vessels are subject to the high-gradient magnetic field. Also, a third sample vessel (5*z*) is received and retained in a second location on the external wall of the sample vessel retaining portion (3) such that only its tip is subject to the magnetic field.

Clearly, the sample vessel retaining portion (4) must be made from a non-magnetic material. The sample vessel retaining portion (4) is preferably formed from material that is easy to clean and is resistant to disinfectant and/or other aggressive chemicals. The sample vessel retaining portion (4) may also be formed from a material that is resiliently deformable such that the at least one formation resiliently deforms to retain a sample vessel (5). The sample vessel retaining portion (4) may also or alternatively be formed from a material that has high frictional properties such that the at least one formation (4*c*) provides a friction fit. The sample vessel retaining portion (4) may be formed from an at least a substantially transparent material such that the sample vessels (5) may be viewed easily.

In the embodiments of the disclosure depicted in FIGS. 1 to 5*b*, the formations (4*c*) to receive and retain a sample vessel are formed in the external wall (4*a*) of the sample vessel retaining portion (4). Thus, in use, the at least one sample vessels (5) are arranged around the outer margin of the sample vessel retaining portion (4). By mounting the at least one sample vessel around the external wall (4) of the sample vessel retaining portion (4) the overall design of the magnetic separation devices depicted in FIGS. 1 to 5*b* are much more compact than a conventional linear-rack or tray arrangement. This is a significant space-saving advantage over the prior art.

Mounting the at least one sample vessel on the external wall (4*a*) of the sample vessel retaining portion (4) means that the sample vessel may be viewed more easily—see FIGS. 1 to 5*b*. This is also a significant advantage over prior art magnetic separating devices where sample vessels are mounted within a linear-rack, tray or internal cavity space and the inspection of the samples is somewhat restricted.

Figure 6A:
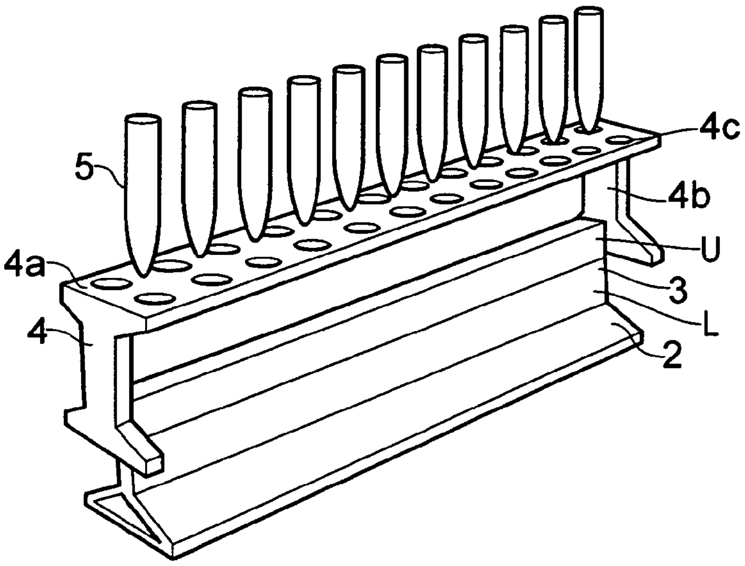
FIGS. 6*a* and 6*b* are an exploded perspective view and a perspective view respectively of a magnetic separation device according to a third embodiment of the disclosure.
Figure 6B:
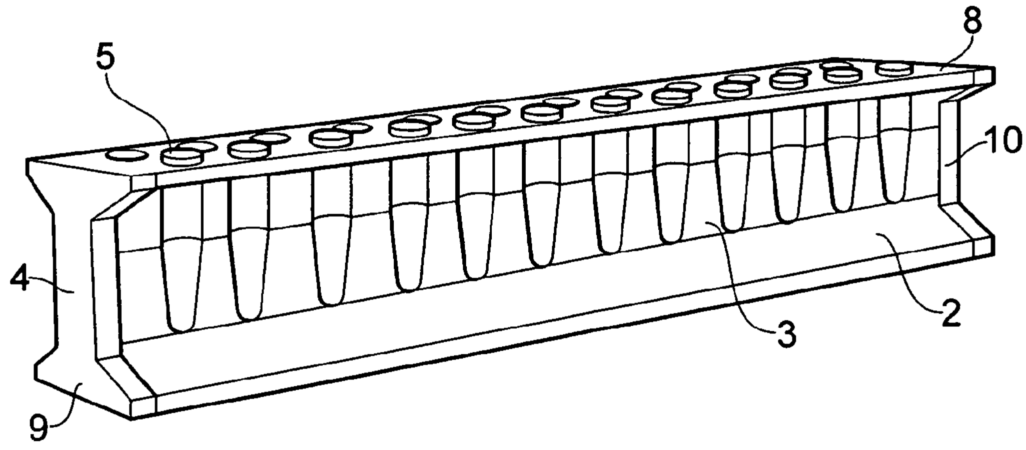

Mounting the at least one sample vessel (5) via the formations (4*c*) formed in the cross-member (8) of the generally U-shaped shaped frame means that the sample vessel may be viewed more easily—see FIGS. 6*a* and 6*b*. This is a significant advantage over the prior art magnetic separation devices where sample vessels are mounted within chambers in a linear rack or tray or any other internal cavity space arrangement and the inspection of the samples is somewhat restricted.

In the first, second, third and fourth aspect of the disclosure, the sample vessel retaining portion (4) of the magnetic separation device may optionally comprise at least one protruding member (30). In the fifth aspect of the disclosure, the sample vessel retaining portion (4) of the magnetic separation device comprises at least one protruding portion member (30). The at least one protruding member is configured to be contactable with a mixing apparatus (100). More specifically, the at least one protruding member is configured such that it may be arranged in a contacting relationship (confronting relation) with the mixing apparatus (100).

The at least one protruding member is preferably configured such that it comprises a contacting surface (30*a*). The contacting surface (30*a*) is configured such that it can sufficiently contact, touch, mate with or confront a corresponding surface of the mixing apparatus such that a contacting relationship is achieved. The contacting surface (30*a*) is preferably a substantially flat end face surface of the protruding member (30). The contacting surface is preferably configured such that it can contact, touch, mate with or confront an upper surface of an agitating plate (100*a*) of the mixing apparatus (100).

Figure 12:
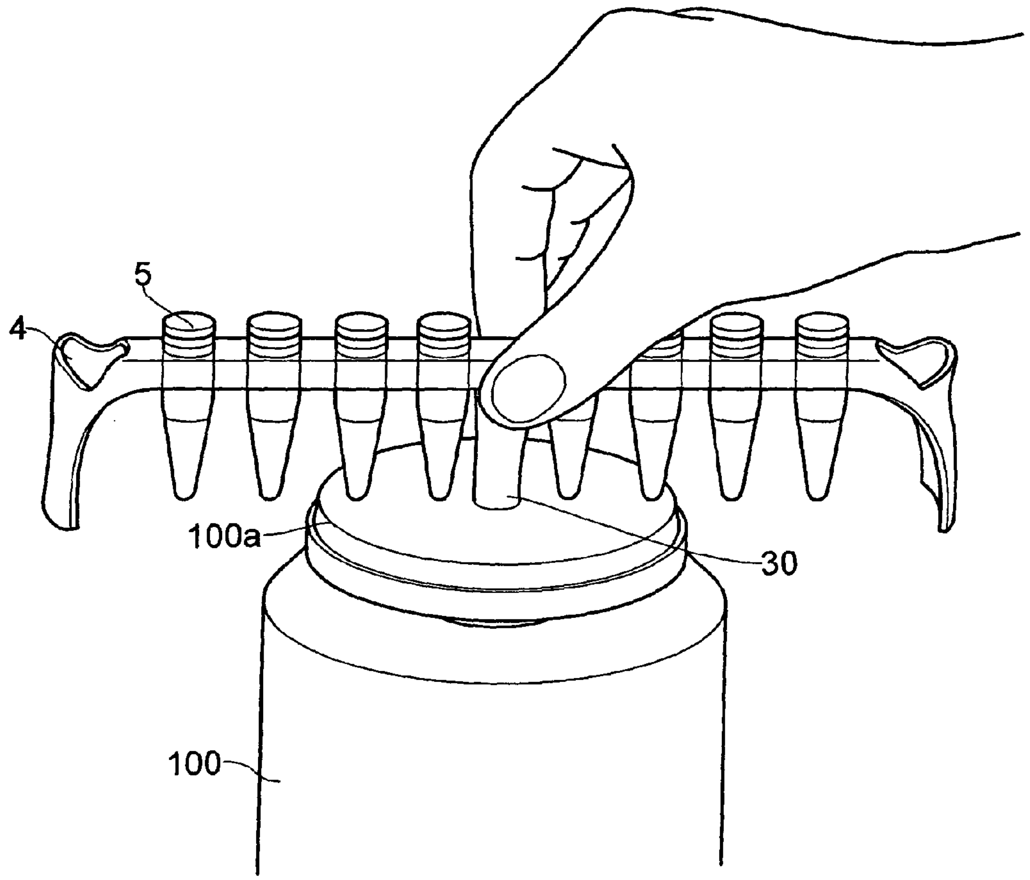
FIG. 12 is a perspective view of the sample vessel retaining portion of magnetic separation device according to the fourth embodiment of the disclosure arranged in contacting relationship with a mixing apparatus.

In order to mix a sample fluid, the sample vessel retaining portion (4) must be arranged with respect to the mixing apparatus (100) such that the at least one protruding member (30) is in contacting relationship (confronting relation) with the mixing apparatus (100)—see FIG. 12. When the at least one protruding member is arranged in contacting relationship with the mixing apparatus, the agitating motion of the mixing apparatus is transmitted throughout the sample vessel portion via the at least one protruding member. The agitating motion of the mixing apparatus (100) is consequently transmitted to the fluid sample (contained in any sample vessel (5) that is retained in the sample vessel retaining portion (4)). When the fluid sample is subject to the agitating motion of the mixing apparatus, the fluid sample is thereby mixed.

Depending on the type of mixing apparatus, the at least one protruding member (30) may be arranged and maintained in a contacting relationship with the mixing apparatus (100) by manually arranging and holding the sample vessel retaining portion (1) with respect to the mixing apparatus—as shown in FIG. 12. Alternatively, the mixing apparatus (100) may comprise at least one protruding member retaining portion to receive and retain the at least one protruding member (30) of the sample vessel retaining portion (4) such that the at least one protruding member may be arranged and maintained in a contacting relationship with the mixing apparatus (100).

The at least one protruding member (30) preferably has a cylinder-like shape, although it may have a frusto-conical shape, cuboid-like shape, finger-like shape or any other suitable shape. The cylinder-like shaped protruding member preferably has a substantially flat end face suitable for achieving a contacting relationship with the mixing apparatus.

The at least one protruding member (30) is arranged on the sample vessel retaining portion (4) such that the agitating motion of the mixing device is transmitted substantially evenly throughout the sample vessel retaining portion (4). It is important that the agitating motion is transmitted substantially evenly throughout the sample vessel retaining portion so as to ensure that all the fluid samples are mixed to the same degree.

The frequency, amplitude, time period and type of agitating motion can be selected in accordance with the type of fluid sample to be mixed, the type of mixing to be achieved, the size, type and number of sample vessels and the volume of the fluid sample.

FIGS. 7*a*-8 and 12 depict an embodiment of the magnetic separation device whereby the sample vessel retaining portion (4) comprises a single protruding member (30). The protruding member extends substantially vertically from the lower surface of the cross-member (8) of the sample vessel retaining portion. The protruding member extends from a substantially central location of the cross-member (8) such that the agitating motion of the mixing apparatus may be transmitted substantially evenly throughout the sample vessel retaining portion. The protruding member has a cylinder-like shape with a substantially flat end face surface. The protruding member is configured such that the substantially flat end face surface can act as a contacting surface (30*a*). FIG. 12 shows that when the sample vessel retaining portion (4) is arranged with respect to the mixing apparatus (100), the protruding member is arranged such that the substantially flat end face surface is in contacting relationship with the upper surface of the agitating plate (100*a*). Thus, in use, the agitating motion of the agitating plate (100*a*) may be transmitted to the fluid samples (contained in the sample vessels (5) that are retained in the sample vessel retaining portion (4)) via the protruding member (30) such that the fluid samples may be mixed.

The protruding member of the sample vessel retaining portion alleviates and/or overcomes some of the problems associated with prior art mixing systems and processes. Not only is the sample vessel retaining portion configured such that a plurality of the fluid samples may be simultaneously agitated and mixed by a mixing apparatus (100), but this particular sample vessel retaining portion of the disclosure is also configured such that the plurality of fluid samples may be simultaneously agitated and thereby mixed whilst the sample vessels remain in-situ in the sample vessel retaining portion during the mixing process—the sample vessels need not be individually and manually transferred from the sample vessel retaining portion to further sample vessel retaining chambers on the mixing apparatus. Due to the at least one protruding member (30), the fluid samples may be mixed merely by arranging the sample vessel retaining portion (4) with respect to the mixing apparatus (100) such that the at least one protruding member is in contacting relationship with the mixing apparatus. Hence, the complexity, process time and risks associated with prior art mixing systems are reduced by using magnetic separation device having a sample vessel retaining portion with at least one protruding member.

The body portion (1) of the magnetic separation device may further comprise at least one cavity (150) that is configured to receive and retain at least one protruding member (30) of the sample vessel retaining portion (4). By configuring the at least one cavity (150) as such the sample vessel retaining portion (4) may be mounted on the body portion (1). In the embodiment depicted in FIGS. 7*a*-8, a cavity (150) is formed in the upper region of the magnetising portion (3). The cavity (150) is configured to receive and retain the protruding member (30) of the sample vessel retaining portion (4).

So as to further improve the visibility, the aspects of the magnetic separation device may also comprise lighting means to illuminate the at least one sample vessel (5). The lighting means may include one or more light emitting diodes (LED). The one or more LED may be arranged on formation of the sample vessel retaining portion, e.g. within the formation (4*e*), and/or arranged on the body portion (1) without obstructing the entry or exit of the sample vessels (5).

The aspects of the magnetic separation device may be further or alternatively provided with magnifying means to magnify at least a predetermined region of a sample vessel (5). The magnifying means are preferably arranged such that it magnifies at least a region of the sample vessel. Clearly, the magnifying means are provided to help further improve the visibility of the sample. The magnifying means may be a lens located adjacent the formations (4*c*) of the sample vessel retaining portion (4).

The particles to be isolated in a sample may be magnetically labelled using conventional magnetic labelling means. For example, the sample may be mixed with magnetic beads that bind to or coat the target particles of interest during a short incubation. The target substance may be, for example, DNA, RNA, mRNA, proteins, bacteria, viruses, cells, enzymes, pesticides, hormones or other chemical compounds.

In operation, a sample and magnetic labelling means are initially placed within a sample vessel. The sample is incubated with magnetic labelling means such that the particles to be magnetically targeted are rosetted. During the incubation period, the sample contained within a sample vessel may be retained by the sample vessel retaining portion. Moreover, the sample vessel retaining portion (4) may be releasably mounted on a non-magnetising portion. The non-magnetising portion is a male part similar to that of the male magnetising portion (3). Hence, the female sample vessel retaining portion (4) may receive and thereby be mounted on the male non-magnetising portion. The non-magnetising portion does not provide a magnetic field. Thus, the magnetic separation device is suitable for use during the incubation period.

At least one coupling member may be provided to releasably engage the sample vessel retaining portion (4) and the non-magnetising portion.

As mentioned above, the foot portion (2) and the magnetising portion (3) may be releasably coupled. Thus, the foot portion (2) and magnetising portion (3) may be uncoupled and the non-magnetising portion may be releasably coupled to the foot portion (2). The body portion (1) or the non-magnetising portion may be configured such that it may be coupled to a rotating sample mixer to help mix the magnetic labelling means and subsequently magnetically labelled particles within the sample.

Alternatively, the magnetic separation device according to the disclosure may comprise a second body portion comprising the non-magnetising portion and a foot portion. Thus, the sample vessel retaining portion may be mounted on the second body portion during the incubation period. The second body portion may be configured such that it may be coupled to a rotating sample mixer.

As previously mentioned, the sample vessel retaining portion may comprise at least one protruding member. In order to help mix the magnetic labelling means and subsequently magnetically labelled particles within the sample, the sample vessel retaining portion may be arranged with respect to a mixing apparatus such that the at least one protruding member is in contacting relationship with the mixing apparatus.

As previously mentioned, the at least one magnet of the magnetising portion (3) may be an electromagnet. Clearly, the electromagnet only provides a magnetic field when switched "on". Thus, a skilled person will appreciate that, when the electromagnet is switched "off", the magnetising portion (3) does not provide a magnetic field and sample vessel retaining portion (4) may be mounted on the magnetising portion (3) during the incubation period.

After incubation, the magnetic separation device may be used to isolate the magnetically labelled particles from the non-magnetic sample medium. The sample vessel retaining portion (4) is mounted on the magnetising portion (3) such that the sample contained within the at least one vessel (5) is subject to a high-gradient magnetic field. During the magnetic separation period, the magnetically labelled particles are attracted by the magnetic field and consequently migrate to a region of the internal surface of the sample vessel adjacent the magnetising portion. This enables the easy removal of the non-magnetic supernatant, possibly using a pipette, whilst the magnetically labelled particles are left isolated in the sample vessel. After washing, the target particles may be used in further studies (positive particle isolation). Magnetic separation may also be used to remove unwanted magnetic particles from a suspension such that substances remaining in the supernatant that is now depleted of the target particles can be used (negative isolation).

By configuring the magnetic separation device such that both the main volume and the tip of a sample vessel are subject to a high-gradient magnetic field, the magnetic separation device is suitable for isolating magnetically labelled particles in both larger volumes and smaller volumes of a sample contained in the same sample vessel. For example, the magnetic separating device may process a sample which substantially fills the sample vessel by subjecting both the tip and main volume of a sample vessel, to a high-gradient magnetic field. After isolating the magnetically labelled particles and removing the supernatant using a pipette, the magnetically labelled particles may be released/separated from the magnetic labelling means using a release-buffer. This may be achieved by adding a small volume of release-buffer to the isolated magnetically labelled particles remaining in the sample vessel. Hence, the same sample vessel may now contain only a small volume filling substantially the tip of the sample vessel. The magnetic separating device may then be used to subject the tip of the sample vessel to a high-gradient magnetic field such that the magnetic labelling means separate from the particles and migrate to a region of the internal surface of the sample vessel adjacent the magnetising portion. The particles released/separated from the magnetic labelling means may then be removed from the sample vessel, e.g. using a pipette.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A magnetic separating device for isolating magnetically labelled particles from a non-magnetic medium comprising:

a body portion having a magnetising portion for providing a magnetic field and a surface by means of which the body portion may stand on a supporting surface, the magnetising portion comprising at least one magnet and an external wall on the outer side of the magnetising portion; and a sample vessel retaining portion for retaining at least one sample vessel, wherein, the external wall of the magnetising portion is configured to conform to at least a substantial portion of only one side of the longitudinal profile of at least one sample vessel;

the sample vessel retaining portion is configured to retain at least one sample vessel such that at least a portion of the contents of the sample vessel is visible to a user;

the sample vessel retaining portion is configured to be mountable on the magnetising portion so that in use, the at least one sample vessel is subject to the magnetic field of the magnetising portion;

the at least one sample vessel arranged on the outer side of the whole magnetising portion; and the at least one sample vessel is arranged in close proximity to and in confronting relation to at least one side wall of the external wall of the magnetising portion, when the sample vessel retaining portion retains the at least one sample vessel.

2. The magnetic separating device according to claim 1 wherein the at least one magnet is configured within the magnetising portion such that a main volume of the sample vessel is subject to the magnetic field.

3. The magnetic separating device according to claim 1 wherein the at least one magnet is configured within the magnetising portion such that only the tip of the sample vessel is subject to the magnetic field.

4. The magnetic separating device according to claim 1 wherein the sample vessel retaining portion comprises at least one formation configured for receiving and retaining a sample vessel.

5. The magnetic separating device according to claim 4 wherein the sample vessel retaining portion comprises an external wall and an internal wall and the at least one formation is a recess formed in the external wall so as to retain the at least one sample vessel proximate the external wall.

6. The magnetic separating device according to claim 4 wherein the sample vessel retaining portion comprises an external wall and an internal wall and the at least one formation is an aperture extending through the sample vessel retaining portion between the external wall and the internal wall.

7. The magnetic separating device according to claim 4 wherein the at least one formation is configured selectively to receive and retain a sample vessel in a first position or a second position, whereby in the first position the sample vessel is arranged with respect to the magnetising portion such that at least a main volume of the sample vessel is subject to the magnetic field and in the second position the sample vessel is arranged with respect to the magnetising portion such that only the tip of the sample vessel is subject to the magnetic field.

8. The magnetic separating device according to claim 4 comprising at least one formation of a first type is formed at a first location and at least one formation of a second type at a second location on the external wall, whereby a sample vessel received and retained in a formation of a first type is arranged with respect to the magnetising portion such that at least a main volume of the sample vessel is subject to the magnetic field and a sample vessel received and retained in a formation of the second type is arranged with respect to the magnetising portion such that only the tip of the sample vessel is subject to the magnetic field.

9. The magnetic separating device according to claim 5 or 6 wherein the magnetising portion comprises an external wall, whereby when the sample vessel retaining portion receives the magnetising portion, the internal wall of the sample vessel retaining portion is in juxtaposition with the external wall of the magnetising portion.

10. The magnetic separating device according to claim 9 wherein the internal wall of the sample vessel retaining portion and the external wall of the magnetising portion are substantially cylindrical.

11. The magnetising separating device according to claim 9 wherein the internal wall of the sample vessel retaining portion and the external wall of the magnetising portion are substantially cuboid.

12. The magnetising separating device according to claim 9 wherein the internal wall of the sample vessel retaining portion is generally U-shaped and the external wall of the magnetising portion is substantially cuboid, whereby when the said sample vessel retaining portion receives the magnetising portion, the generally U-shaped internal wall of the sample vessel retaining portion is in juxtaposition with a corresponding generally U-shaped portion of the substantially cuboid shaped external wall of the magnetising portion.

13. The magnetising separating device according to claim 9 wherein the external wall of the magnetising portion is configured to conform at least approximately to at least a substantial portion of the longitudinal profile of the sample vessel.

14. The magnetising separating device according to claim 13 wherein the external wall comprises an first portion that is configured to conform at least approximately to the longitudinal profile of the main volume of the sample vessel and a second portion that is configured to conform at least approximately to the longitudinal profile of the tip of the sample vessel.

15. The magnetising separating device according to claim 2 wherein the at least one magnet is configured within the magnetising portion to conform at least approximately to the longitudinal profile of the main volume of the sample vessel.

16. The magnetising separating device according to claim 3 wherein the at least one magnet is configured within the magnetising portion to conform at least approximately to the longitudinal profile of the tip of the sample vessel.

17. The magnetic separating device according to claim 1 further comprising at least one coupling member to releasably engage the sample vessel retaining portion and the magnetising portion.

18. The magnetic separating device according to claim 17 wherein the coupling member comprises an 0-ring to frictionally engage the sample vessel retaining portion and the magnetising portion.

19. The magnetic separating device according to claim 1 wherein the surface by means of which the body portion may stand on a supporting surface is a lower surface of a foot portion.

20. The magnetic separating device according to claim 1, further comprising a rotatable mounting member to rotatably mount the magnetising portion with respect to the foot portion, wherein the rotatable mounting member comprises a ball bearing and socket arrangement.

21. The magnetic separating device according to claim 1 further comprising releasable engaging means whereby the sample vessel retaining portion can be mounted at any selected one of a range of mounting positions on the magnetising portion.

22. The magnetic separation device according to claim 1 further comprising a further body portion having a non-magnetising portion and a surface by means of which the further body portion may stand on a supporting surface and wherein the sample vessel retaining portion is configured to be mountable on the non-magnetising portion.

23. A magnetic separation device according to claim 1 wherein the sample vessel retaining portion further comprises:

at least one protruding member configured to be contactable with a mixing apparatus wherein the least one protruding member is arranged in contacting relationship with a mixing apparatus; and the body portion further comprises:

at least one cavity to receive and retain the at least one protruding member so that the sample vessel retaining portion may be mounted on the body portion.

24. The magnetic separation device according to claim 23 wherein the at least one protruding member is configured to be contactable with an agitating plate of the mixing apparatus.

25. The magnetic separation device according to claim 23 wherein the at least one protruding member is configured to be contactable with an intermediate member, that is coupled to an agitating plate of the mixing apparatus.

26. The magnetic separation device according to claim 23 wherein the at least one protruding member is configured to be received and retained by an agitating cavity and/or a protruding member retaining portion of the mixing apparatus.

27. The magnetic separation device according to claim 23 wherein the at least one protruding member protrudes substantially perpendicularly from a lower surface of the sample vessel retaining portion.

28. The magnetic separation device according to claim 23 further comprising at least one surface by means of which the sample vessel retaining portion may stand on a supporting surface.

* * * * *